INVENTORS.
MARTIN F. O'BRIEN
HOWARD F. MOORE
BY Bailey + Dority
ATTORNEYS

United States Patent Office 3,414,905
Patented Dec. 3, 1968

3,414,905
SYSTEM FOR MONITORING THE OPERATION OF
A PLURALITY OF MACHINES
Martin F. O'Brien and Howard F. Moore, Greenville,
S.C., assignors to Frontier Electronics, Inc., Greenville,
S.C., a corporation of South Carolina
Filed Dec. 27, 1966, Ser. No. 611,205
15 Claims. (Cl. 346—33)

ABSTRACT OF THE DISCLOSURE

A system for monitoring the operation of a plurality of machines wherein a signal is produced responsive to the occurrence of a particular operating condition of a machine which indicates the unattended down-time of a particular machine, the attended time during shutdown and the cause of shutdown of the machine. The signals can be fed into a data collector, preferably in the form of indicia producing means operated by electromagnetic means.

---

Figure 1:
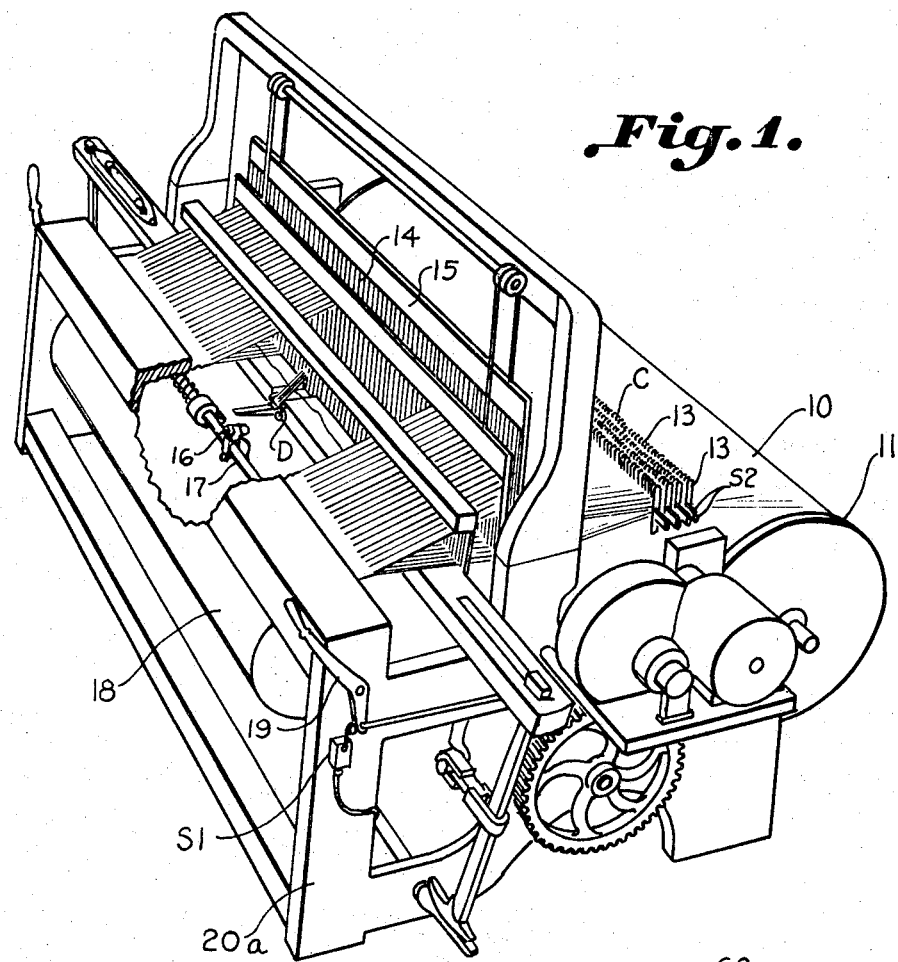

This invention relates to a device for monitoring the operation of a large number of machines, and more particularly to a monitoring device for textile strand manipulating machines which produces a printed record indicating when a particular machine is shut down or has a faulty operation, as well as the cause for such shutdown. The printed record produced by the monitoring device also indicates the unattended time during a shutdown period, as well as the attended time or period necessary to remedy the cause of such shutdown.

Heretofore, monitoring devices used in the textile industry produced records printed on paper indicating which machine, such as a loom, was shut down and the duration of such shutdown. However, in order to more effectively manage the operation of looms in a mill it is desired to know the cause of the shutdown of the loom, as well as which machine is shut down, and the duration of such shutdown. Moreover, it is desired to know the unattended time during shutdown of a loom, as well as the attended time or time necessary to repair the loom. From this management can more accurately determine the overall efficiency of the operators, as well as the looms. For example, if a particular operator is repairing a loom when another loom is shut down, it is desired that the printed record indicate that the operator was working on the first loom and could not work on the second loom. However, if the operator is not working on a loom when a loom is shut down, it is desirable to know exactly how long it took him to reach the loom.

Monitoring devices have been utilized in industries other than the textile industry for indicating the down-time or faulty operation of a particular machine and the cause of such faulty operation. Normally, such has been accomplished by placing a particular frequency generator with a fault sensing device on the machine so that when the machine was shut down the particular fault sensing device caused an identifying frequency to be reproduced. This frequency in turn was utilized to control a recorder for printing an identifying record. One example of such a system is illustrated in Patent No. 3,229,300, granted to Thompson et al., on Jan. 11, 1966.

Accordingly, it is an important object of this invention to provide a monitoring device for a plurality of machines such as looms, which produces a printed record indicating when a particuar machine is shut down.

Another important object of the present invention is to provide a monitoring device for a plurality of looms which produces a printed character indicative of the cause of the shutdown of a particular loom, as well as the duration of the down-time of the loom.

Still another important object of the present invention is to provide a monitoring device for a group of looms which produces a signal indicative of the cause of shutdown of a particular loom, as well as indicative of the time it took an operator, such as a loom fixer or weaver, to get to the machine and the time necessary to remedy the situation.

Still another important object of the present invention is to provide a monitoring device for a plurality of machines which produces an identifying character when a faulty operation occurs on a machine which is very simple to comprehend and interpret.

A further important object of the present invention is to provide a monitoring device for a plurality of machines which is simple, inexpensive, and compact.

The construction designed to carry out the invention will be hereinafter described, together with other features thereof.

Figure 2:
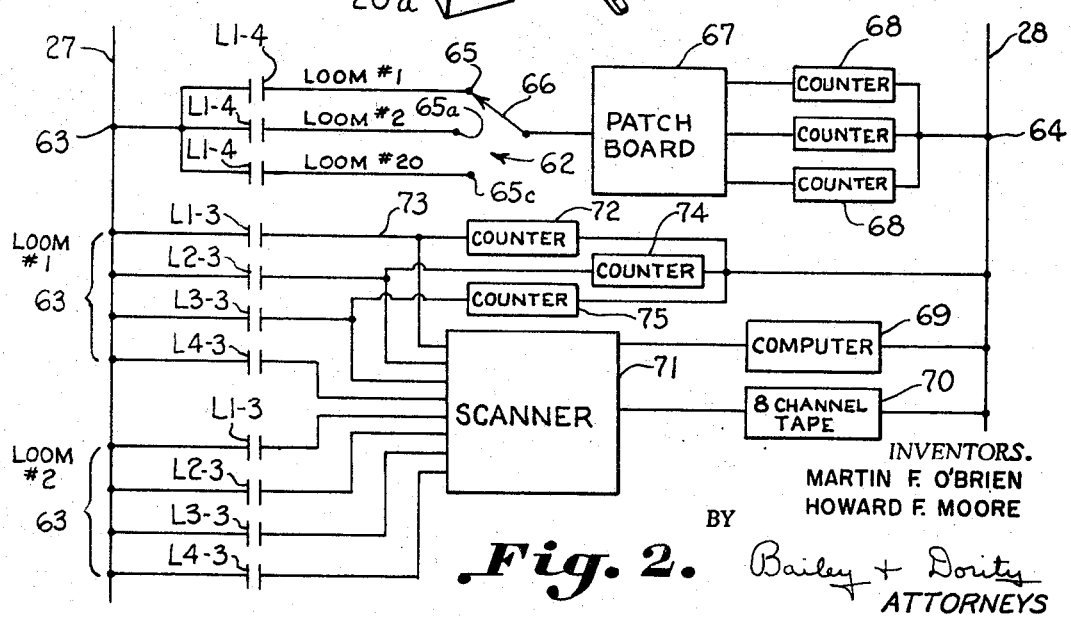
Figure 3:
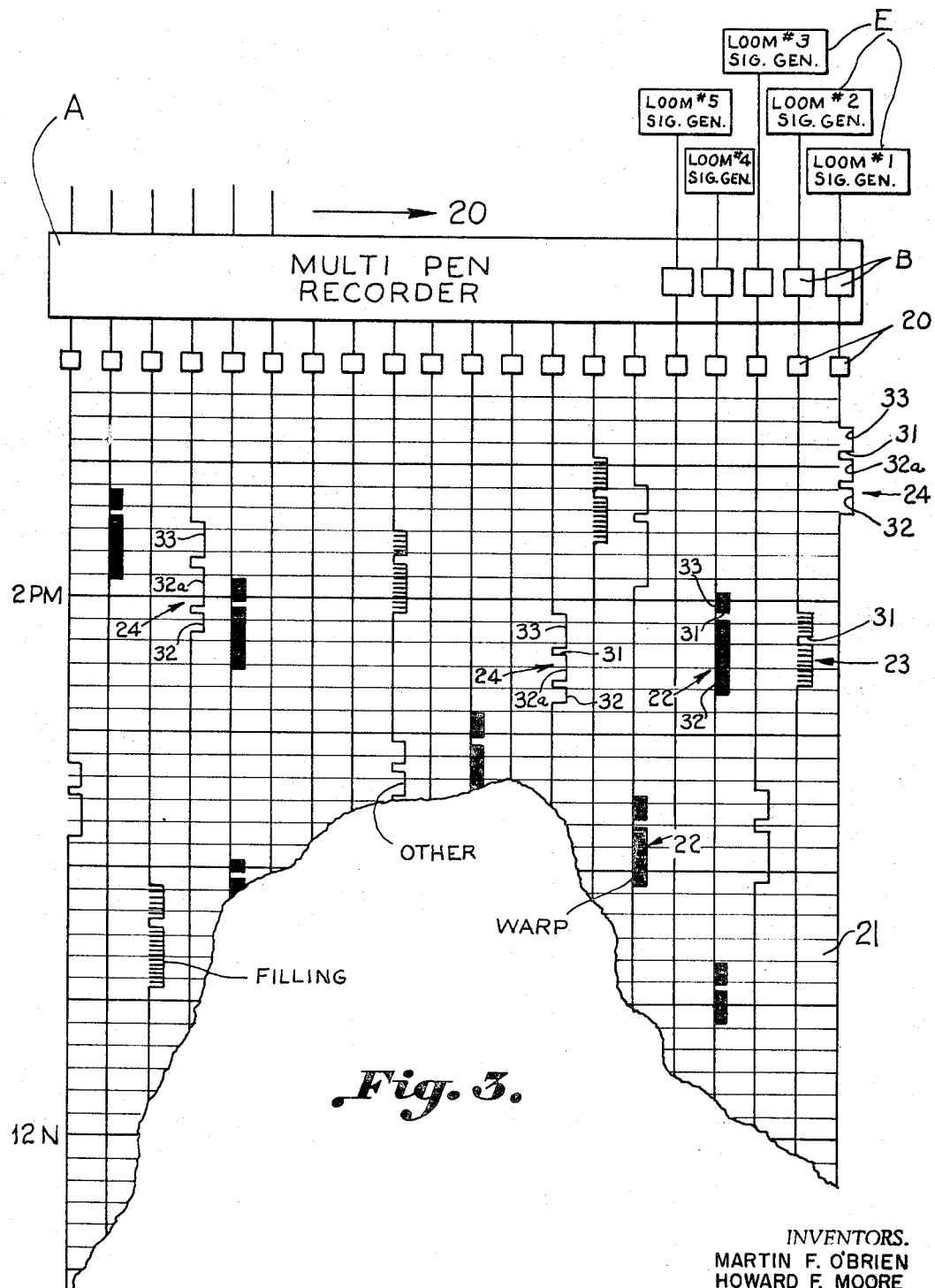
Figure 4:
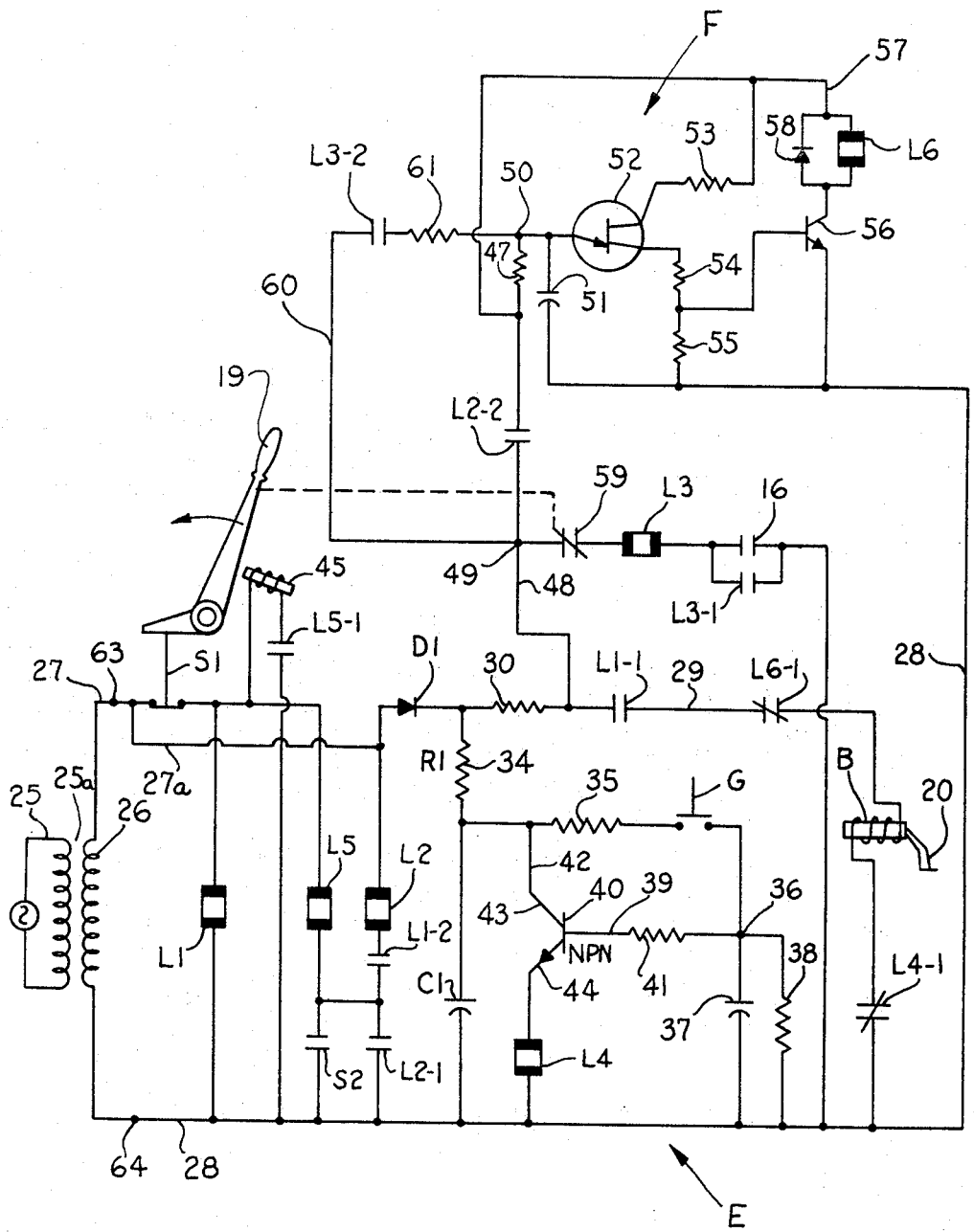

The invention will be more readily understood from a reading of the following specification and by reference to the accompanying drawings forming a part thereof, wherein an example of the invention is shown and wherein:

FIGURE 1 is a schematic perspective view illustrating a loom and the various electrical connections therefor mounted in accordance with the present invention, FIGURE 2 is a schematic circuit diagram illustrating totalizing devices, computers and the like, which may be utilized in the subject invention, FIGURE 3 is a block diagram illustrating signal generating devices carried on a plurality of looms for sending signals to respect pens of a multipen recorder for making a record of the operation of the looms, and FIGURE 4 is a schematic diagram of an electric signal generating device which may be mounted on a loom or the like, for generating signals when the loom is shut down.

The drawings illustrate a system for monitoring the operation of a plurality of machines, such as looms, which produce distinguishable characters for identifying the cause of a shutdown of a machine, as well as for identifying the unattended and attended time during the duration of the shutdown. The system includes a multiple pen recorder A which has a plurality of pens, which are held in contact with paper being fed thereunder. Individual electromagnetic means B is provided for operating each pen for causing the pen to change the position of the line it draws on the paper when activated. A plurality of condition responsive devices are carried on each loom, and are activated responsive to the occurrence of a particular faulty operation such as the warp yarn breaking, the filling yarn breaking, etc. In the particular embodiment illustrated, two of the condition responsive devices on the loom are a warp yarn sensing device C and a filling yarn sensing device D which automatically closes an electric switch when either of the yarns break to stop the operation of the loom. A signal generating means E, which includes an oscillator F, is carried on each loom. Means are provided for connecting one of said condition responsive devices to the oscillator F in the signal generating means E for causing the oscillator to produce an output signal having a first frequency when the condition responsive device is activated. Means is provided for connecting another of the condition responsive devices to the oscillator F of the signal generating means E for causing the oscillator to produce an output signal having a second frequency when the condition responsive device is activated. Means are provided for supplying the outputs of the signal generating means E, which includes the output of the oscillator F, to a respective electromagnetic means B. The electromagnetic means causes the pen associated therewith to change the position of the line being drawn on the paper responsive to the particular output signal being supplied thereto for producing a distinguishable character which identifies the cause of the shutdown or faulty operation of the machine. Means G is coupled to the signal generating means E for interrupting the output signals therefrom responsive to an operator activating such, and for interrupting the continuity of the distinguishable marks while maintaining the character. Thus, the character identifies the cause of the shutdown or faulty operation of a particular machine, as well as identifies the unattended and attended time during the shutdown.

Heretofore, incentive pay for weavers and loom fixers has been determined by the efficiency of a loom rather than individual effort. The monitoring device constructed in accordance with the present invention provides management with information so that the work time of a weaver or loom fixer can be determined, and a weaver is not penalized when the loom is down for a reason beyond his control. Thus, incentive pay for an employee can be more equitably determined; that is to say based on the effective working time of an employee rather than the efficiency of a machine. This is accomplished by providing a signal wherein a portion of the signal preceding an interruption indicates the unattended down-time of the machine and a portion of the signal succeeding the interruption indicates the attended time during shutdown and the character of the signal identifies the cause of shutdown of the machine.

Referring more particularly to FIGURE 1 of the drawing, a conventional loom is illustrated showing warp yarn 10 coming off a loom beam 11 and being fed over the usual whip roll. The warp yarn 10 is then fed through the usual drop wires 13 which form part of the warp yarn condition responsive device C. When any of the warp strands break the drop wire 13, which is carried thereon, is allowed to fall and close an electrical circuit to stop the operation of the loom, as well as to provide a signal for the signal generating means E associated with the loom. Such warp yarn stopping device is a conventional item on most looms. The warp yarn is then fed through the heddles 14 carried by the harness 15 to provide a shed for the passage of the shuttle. A filling yarn stop motion device D is carried on the loom for sensing a breakage of the filling yarn. Thus, when the filling yarn breaks an electric circuit or switch is closed causing the loom to stop. A mercury switch 16 is carried on a rod 17 which pivots slightly when the filling breaks and the filling stop motion device causes the loom to shut down. Such pivoting of the rod 17 causes the mercury switch to be momentarily closed. This mercury switch 16, as well as a switch S2 operated by the drop wires 13, act as condition responsive devices for producing a signal when a faulty operation occurs, such as shutting down of the loom.

After the shuttle has passed through the shed formed by the heddles and the filling yarn has been beat up the cloth is then fed onto a take-up roll 18.

The loom may also be stopped by moving a shipper handle 19 in a counterclockwise direction. It is noted that a switch S1 is carried on the frame 20a of the loom adjacent the shipper handle so that such is open when the shipper handle is moved in the counterclockwise direction to stop the loom. Such switch S1 is also considered to be a condition responsive device for sensing when the loom is manually shut down.

Thus, the loom has three condition responsive devices mounted thereon; the drop wires 13 carried on the warp yarn which closes the switch S2 when the warp yarn breaks, the mercury switch 16 associated with the filling yarn stop motion device, and the switch S1 carried adjacent the shipper handle 19 which is closed when the shipper handle is utilized to shut down the loom. Other types of condition responsive devices may be aptly utilized. To this point, the structure described in connection with the loom illustrated in FIGURE 1 is all conventional structure except for the mercury switch 16 associated with the filling stop motion device and the switch S1 positioned adjacent the shipper handle.

The warp sensing device C, which includes the drop wires 13, the filling sensing device D which includes the mercury switch 16, and the switch S1, cause the signal generating means E associated with each loom to generate a distinctive signal when closed. Such identifies the particular switch which has been closed, thus identifying the cause of the shutdown of the loom. Each signal generator E is connected to an electromagnetic device B of a multipen recorder for causing a respective pen 20 to change the position of the line that is being drawn on a paper 21 which is being moved relative thereto. Any suitable multipen recorder may be utilized and in the preferred embodiment a multipen recorder manufactured by Esterling Angus Instrument Company, Inc. of Indianapolis, Ind., having a Model No. AG 620T is utilized with a chart paper having a Model No. 37020.

Each of the pens has an electromagnetic means B connected thereto so that when such is energized the pen is displaced horizontally from the normal "zero" line. Thus, by alternately energizing the electromagnetic means B associated with a pen, distinguishable marks having a distinct character identifying the cause of the shutdown of a machine are drawn on the chart as it is moved under the pens 20. For example, when a warp yarn breaks the character 22 is produced (FIGURE 3), when a filling yarn breaks the character 23 is produced, and when the loom is stopped for any other reason by moving the shipper handle 19 in a counterclockwise direction the character 24 is produced. The warp character 22 is produced by alternately energizing the electromagnetic means B associated with the pen every twenty seconds. This produces a plurality of horizontal lines which run together to produce a substantially solid rectangular block. The filling character 23 is produced by energizing the electromagnetic means B at a frequency of once per sixty seconds for causing a plurality of spaced horizontal lines to be produced. The duration that the lines are produced indicates the duration of the machine shutdown. The other signal 24 is produced by energizing the electromagnetic means B for the duration that the machine is shut down.

Means (not shown) is provided for moving the chart relative to the pens so that such travels at a predetermined rate as indicated by the reference to time on the margin of the chart.

FIGURE 4 is a schematic diagram of a signal generating means E constructed in accordance with the present invention. Each loom being monitored has one of the signal generating means E connected thereto. When the loom is operating a 550 volt A.C. signal is applied to the primary winding 25 of a step-down loom transformer 25a causing 12 volts to be applied to the secondary winding 26 of the transformer. Such voltage causes current to flow through lead 27, normally closed switch S1, and through a relay L1 back through lead 28. As pointed out previously, the switch S1 is physically coupled to the shipper handle 19, and when the shipper handle is rotated in a counterclockwise direction such causes the switch S1 to open de-energizing relay L1. When relay L1 is de-energized, normally open contacts L1–1 interposed in lead 29 are closed. Current then flows from the secondary of transformer 26 through lead 27, lead 27a, a rectifier diode D1, which rectifies the A.C. signal to a D.C. signal, resistor 30, the closed contacts L1–1, lead 29, normally closed contacts L6–1 to an electromagnetic means B, such as a relay coil causing the coil to be energized. When the relay coil B is energized such causes a pen 20 associated therewith to be displaced laterally on a recording chart 21, which is moving slowly in a vertical direction, to produce an identifying mark. The pen remains in the laterally displaced position until the relay coil is again de-energized. The relay coil B, the pen 20, and the chart upon which the signals are being recorded are conventional items.

When the recording pen 20 is displaced as a result of the shipper handle 19 being moved to open the loom circuitry a distinct character, such as illustrated at 24, is produced on the chart. This character is generally referred to as an other character since the machine may have been stopped for several different reasons. Since the recording paper is moving in a vertical direction and the pen 20 is displaced from its normal position, a displaced line will be placed on the recording chart until the weaver reaches the loom. When the weaver reaches the loom he depresses a signal interrupt button G which causes the relay coil 20 to be momentarily de-energized causing the pen to return to its normal position. Such interrupts the continuity of the distinguishable mark while maintaining the character thereof. In the characters illustrated in FIGURE 3 such interruption shows up as a blip 31. As soon as the interrupt circuit is opened the coil B is again energized causing the pen to again be displaced. The weaver then flags the loom fixer, and when the loom fixer reaches the loom he depresses the interrupt button G. This causes a second blip 31 to be produced in the other signal 24. After the loom fixer releases the button G the pen continues recording in its displaced position until the loom is restarted by moving the shipper handle 19 in a clockwise direction to the position illustrated in the drawing.

Thus, from analyzing the signal produced on the chart it can be seen that a first portion 32 of the signal identifies the time it took the weaver to get to the loom, the second portion 32a identifies the time it took the loom fixer to get to the loom after he was flagged, and a last portion 33 identifies the duration or time necessary to repair the machine. When the loom is stopped by the breaking of a warp yarn or filling yarn the characters merely have an unattended portion 32 and an attended portion 33.

When the operator depressed the interrupt button G such completed a circuit from lead 27 through lead 27a, diode D1, a resistor 34, another current limiting resistor 35 to junction 36, and a resistor capacitor network consisting of capacitor 37 and resistor 38. Such causes a positive voltage to be placed at junction 36 and on a base electrode 39 of an N-P-N transistor 40 through a base resistor 41. Such also causes capacitor 37 to charge to a positive value and maintain a voltage on the base of transistor 40 for a period slightly greater than sixty seconds. The interruption should be slightly longer than sixty seconds so that the interruption appears even when the output signal consists of pulses which appear every sixty seconds. Another reason is that the signal generating means on a plurality of machines are frequently scanned by a one r.p.m. scanner, and in order for the interruption to show up every time such must be for longer than a minute.

When a positive potential is applied to the base of transistor 40 current flows through resistor 34, lead 42, a collector electrode 43 and out an emitter electrode 44 to a blip relay L4, energizing the relay. When relay L4 is energized, such opens contacts L4–1 in series with the relay coil B de-energizing the coil and causing the identifying blip 31 to be produced. When the situation which caused the loom to be shut down is remedied, the shipper handle 19 is moved in a clockwise direction closing switch S1. Such causes relay L1 to again be energized and open contacts L1–1 interposed in lead 29. The opening of contacts L1–1 de-energizes the relay coil B and returns the pen 20 to its initial position.

When the loom is shut down for one of the more common causes, such as a warp yarn breaking or a filling breaking, it is desired to produce an identifying signal for facilitating in identifying and isolating the causes of such stops. For example, as the warp yarn breaks the conventional drop wire 13 carried on such causes a switch S2 to be closed and energize relay L5 interposed between leads 27 and 28. When relay L5 is energized contacts L5–1 are closed causing a solenoid 45 to be energized. The energization of the solenoid causes a conventional latching mechanism (not shown) to permit the shipper handle 19 to be moved in a counterclockwise direction knocking off the machine and opening switch S1. When switch S1 opens such causes relay L5 to be de-energized and open the contacts L5–1 and de-energize the solenoid 45. As the drop wire switch S2 was closed warp relay L2 was also energized by current flowing through lead 28, contacts L1–2 and the closed switch S2. The energization of relay L2 causes the normally open contacts L2–1 to close sealing in the circuit around the drop wire switch S2.

The energization of relay L2 closes contacts L2–2 and completes a current path to an oscillator circuit, generally designated at F. A resistor 47 is in series with contacts L2–2 which causes the oscillator to oscillate at twenty second intervals. However, if a filling yarn breaks, a different resistance is placed in series with the oscillator F and causes the oscillator to oscillate at sixty second intervals. The circuitry for such is discussed below.

Each time the oscillator F oscillates a relay L6 is momentarily energized which causes contacts L6–1 in series with the relay coil B to be momentarily opened. Such causes the pen 20 associated with the relay coil to be moved to its initial position and then return to the displaced position producing a horizontal mark. Since the chart is moving at a relatively slow speed, the successive horizontal marks form a substantially solid black rectangular mark which identifies a warp stoppage.

The current path taken when the contacts L2–2 are closed as a result of the warp stoppage relay L2 being energized is through leads 27, 27a, diode D1, resistor 30, lead 48, junction 49, contacts L2–2, resistor 47 to junction 50. Such causes capacitor 51 to charge to the firing potential of a unijunctional transistor 52. When transistor 52 fires a voltage drop is produced across resistors 53, 54 and 55. Such voltage drop is applied to the base of an N-P-N transistor 56 causing the transistor to turn on. When the transistor turns on current flows through lead 57, the relay L6 through the collector and emitter of the transistor back to lead 28 energizing the relay L6. As previously mentioned, when the relay L6 is energized such momentarily interrupts the displacement of the pen. Relay L6 is shunted with a diode 58 so as to avoid undesired spurious voltages.

If there is a filling yarn breakage, switch 16 is momentarily closed. The switch 16 is a mercury switch which is operated by a conventional filling stop motion device. When the switch 16 is closed relay L3 is energized by current flowing through leads 27, 27a, 48, normally closed switch 59 and back to lead 28. The energization of relay L3 closes contacts L3–1 sealing in the circuit around the filling switch 16. The energization of relay L3 also causes contacts L3–2 interposed in lead 60 to be closed. Such places a higher value resistor 61 on the base of the unijunctional transistor 52 and the capacitor 51 than when resistor 47 was connected thereto. This causes the unijunctional transistor 52 to fire as a result of the discharge of capacitor 51 at sixty second intervals. As a result the relay L6 is energized at one minute intervals causing the pen relay coil B to be de-energized at corresponding intervals. This produces a plurality of successive horizontal lines on the chart forming the character 23. It is noted that any of the signals 22, 23 or 24 may be interrupted by depressing the interrupt button G for causing an identifying blip 31 to appear in the character in the same manner as was previously described in connection with the description of the other signal 24.

The switch 59 is directly connected to the shipper handle 19, and is momentarily opened when the shipper handle is moved in a clockwise direction to restart the loom. The purpose of momentarily opening switch 59 is to de-energize the relay L3 and open the contacts L3–1 sealing in the filling yarn switch 16. One suitable switch is manufactured by Micro Corporation of Freeport, Ill., and has a part number 9BS1.

A filter capacitor C1 is interposed in the circuit for co-operating with diode D1 to provide a D.C. signal therebeyond. The purpose of contacts L1–2 is to open the circuit including relay L2 and contacts L2–1 when the machine is restarted. For example, when the shipper handle 19 is pushed to the "On" or "Start" position the switch S1 is closed energizing relay L1. Such causes contacts L1–2 to open de-energizing the relay L2 and opening the contacts L2–1 around the drop wire switch S2.

Frequently, it is desired to provide a record of the total down-time of particular groups of machines. For example, one group of machines may be assigned to one loom fixer while another group may be assigned to still another loom fixer. By totalizing the total down-time of the looms of the first group of machines management can determine instantaneously the exact period of time that the machines of a particular group have been down. One means of accomplishing such is by connecting a totalizing circuit, generally designated at 62 in FIGURE 2, between the terminals 63 of a respective signal generating means E, and a common terminal 64. These terminals are interposed in the leads 27 of a respective circuit, such as illustrated in FIGURE 4, and a common lead 28. This circuit includes a plurality of contacts L1–4 connected in shunt relation. Each of these contacts is closed when a respective relay L1 on a loom is energized allowing a voltage to be placed on a corresponding terminal 65. A scanner schematically illustrated by the arm 66 scans the contacts once per minute for determining if any of the looms have been shut down. Any number of looms may be scanned by merely connecting a pair of contacts, such as L1–4, in parallel with the other contacts and have such operated by the main loom relay L1.

As previously mentioned, the scanner may be any suitable scanner and conveys the information carried in the form of a voltage on the contacts 65 to a patchboard 67. The patchboard 67 may be programmed in any suitable manner so that the total down-time of selected groups of machines may be determined. Counters 68 are coupled to the patchboard for totalizing the down-time of a particular group of machines. Thus, by observing the dials on the counters 68 management can determine the total down-time of the machines assigned to any one operator.

Frequently, mills also desire to have a permanent record of the causes of the shutdowns of the loom. This is accomplished by means of a circuit, which includes a computer 69 and/or an eight channel punch tape 70. The circuit includes groups of contacts including contacts L1–3, L2–3, L3–3 and L4–3 operated by each of the relays L1 through L4, respectively, and are placed between lead 27 of a respective signal generating means and a scanner 71. The contacts may be connected to terminal 63 interposed in lead 27. If twenty looms were being monitored, the scanner would have eighty input terminals and each of the contacts L1–3 through L4–3 would be connected to a respective input terminal. Any time the relays which operate the contacts change from their normal operating state a respective contact is closed allowing a voltage to be placed on the respective input terminal of the scanner. The output of the scanner is supplied to the computer 69 for storing the information for subsequent interrogation. The output of the scanner is also fed into an eight channel tape 70 for making a permanent record thereof. The computer 69 and the tape 70 are electrically connected between the scanner 71 and a common lead 28. One suitable eight channel tape punch machine is manufactured by Teletype Corporation of Skokie, Ill., and has a Model No. 33ASR.

Individual counters can be associated with each loom in order to record the number of times the loom has been shut down for a particular cause. For example, the counter 72 interposed between lead 73 and common lead 28 would record the number of times the relay L1 has been energized, and as a result, the number of times the loom has been shut down. Counters 74 and 75 would record the number of times the loom has been shut down for warp yarn breaking and filling yarn breaking, respectively. As noted, counters 74 and 75 are wired between relay contacts L2–3 and L3–3 and common lead 28.

Thus, according to the demands and desires of particular mills the circuitry is adapted to be modified for producing substantially any type of record of down-time of the machines.

While this invention is particularly adapted for use on looms and has been described in that context, it is to be understood that the novel features thereof would have application to other machines wherein similar problems are presented.

While a preferred embodiment of the invention has been described using specific terms, such description is for illustrative purposes only, and it is to be understood that changes and variations may be made without departing from the spirit or scope of the following claims.

What is claimed is:

1. A system for monitoring the operation of a plurality of machines, producing distinguishable characters identifying the cause of the shutdown of an individual machine, as well as identifying the unattended and attended time during the duration of such shutdown comprising: a multiple pen recorder having a plurality of pens; means for feeding paper along in contact with said pens; individual electromagnetic means for operating each pen for causing such pen to change the position of the line it draws on the paper; signal generating means coupled to each machine for generating a plurality of distinguishable signals identifying the cause of shutdown of a machine; means for coupling said signal generating means to respective electromagnetic means for causing the pen associated therewith to change the position of the line being drawn on the paper for producing distinguishable marks having a distinct character identifying the cause of the shutdown of a machine; and means coupled to said signal generating means for interrupting said distinguishable signals responsive to an operator actuating such when attending the machine causing the continuity of said distinguishable marks to be interrupted while maintaining the character thereof, whereby the distinguishable characters identify the cause of the shutdown of a particular machine as well as identify the unattended and attended time during said shutdown.

2. The system as set forth in claim 1, wherein each of said machines being monitored has a plurality of condition responsive devices carried thereon which are activated when a particular faulty operation occurs to shut down the machine and wherein said signal generating means includes an oscillator circuit, means connecting selected condition responsive devices to said oscillator circuit for causing said oscillator circuit to oscillate at different frequencies depending on which condition responsive device has been activated, and means for connecting the output of said oscillator circuit to a respective electromagnetic means for causing the pen associated with such to change the position of the line it draws on the paper according to the oscillation of said oscillator.

3. The system as set forth in claim 2, wherein at least one of said condition responsive devices is connected directly to a respective electromagnetic device via the signal generating means bypassing the oscillator for causing the pen associated therewith to change the position of the line being drawn when activated.

4. The system as set forth in claim 1, wherein said means for interrupting said distinguishable signals includes an electric circuit, said electric circuit being electrically connected to a respective electromagnetic means, a manually operable switch interposed in said electric circuit for preventing said electromagnetic means from being activated for a predetermined period of time when said switch is activated by an operator.

5. The device as set forth in claim 1 further including: a scanner provided for scanning said signal generating means of a plurality of machines; and data gathering means coupled to said scanner for monitoring the operation of said machines.

6. The device as set forth in claim 5 including: a patchboard connected to the output of said scanner for grouping the output signals from said signal generating means into preselected groups; and said data gathering means includes a totalizing means and is coupled to said scanner through said patchboard for totalizing the down-time of preselected groups of said machines.

7. In a system for monitoring the operation of a plurality of machines producing distinguishable characters identifying the cause of the shutdown of individual machines as well as identifying the unattended and attended time during such shutdown period, said system having a multiple pen recorder having a plurality of pens, means for feeding paper along in contact with said pens, and individual electromagnetic means for operating each pen for causing such pen to change the position of the line it draws on the paper, the improvement including: a plurality of condition responsive devices carried by each machine capable of being activated responsive to the occurrence of a shutdown caused by a particular operation; signal generating means including an oscillator coupled to each machine; means for connecting one of said condition responsive devices to the oscillator in said signal generating means for causing said oscillator to produce an output signal having a first frequency when said one of said condition responsive devices is activated; means for connecting another of said condition responsive devices to said oscillator in said signal generating means for causing said oscillator to produce an output signal having a second frequency when said another of said condition responsive devices is activated; means for supplying the outputs of said signal generating means which includes the output of said oscillator to a respective electromagnetic means, said electromagnetic means causing the pen associated therewith to change the position of the line being drawn on the paper responsive to the output signal being supplied thereto for producing distinguishable marks forming a character for identifying the cause of the particular operation of a machine; and means coupled to said signal generating means for interrupting said output signals responsive to an operator activating such and for causing the continuity of said distinguishable marks to be interrupted while maintaining the character, whereby the character identifies the cause of the shutdown of a particular machine as well as identifies the unattended and attended time during said faulty operation.

8. The combination as set forth in claim 7, wherein one of said condition responsive devices is a switch operated by a warp yarn stop motion device on a loom and wherein said another of said condition responsive devices is a switch operated by a filling yarn stop motion device on a loom and still another condition responsive device is a switch operated by a shipper handle on a loom.

9. In a textile strand manipulating machine a signal generating means for generating a signal identifying the cause of the shutdown of the machine as well as identifying the unattended and attended time during the duration of such shutdown comprising: a plurality of condition responsive devices each of which is activated responsive to a particular operation which causes shutdown of said machine; an oscillator circuit; means connecting one of said condition responsive devices to the oscillator for causing said oscillator to produce a signal at the output of said signal generating means having a first frequency representing a character for identifying the cause of shutdown of a machine when said one of said condition responsive devices is activated; means for connecting another of said condition responsive devices to the oscillator for causing said oscillator to produce a signal at the output of said signal generating means having a second frequency representing another character for identifying the cause of shutdown of the machine when said another of said condition responsive devices is activated; a data gathering device coupled to the output of said signal generating means for monitoring the operation of said machine; and means coupled to said signal generating means for momentarily interrupting the continuity of said output signal responsive to an operator actuating such while maintaining the identity of said output signal, whereby the portion of an output signal preceding the interruption of the signal indicates the unattended down-time of the machine and the portion of the signal succeeding the interruption indicates the attended time during such shutdown and the character of said signal identifies the cause of shutdown of the machine.

10. The system as set forth in claim 9, wherein at least one of said condition responsive devices is connected directly to the data gathering device through said signal generating means bypassing said oscillator.

11. In a loom in which warp yarn and a filling yarn are being woven for producing cloth a signal generating means for generating a signal identifying the cause of shutdown of the loom as well as identifying the unattended and attended time during the duration of such shutdown comprising: a plurality of condition responsive devices each of which is activated responsive to a particular operation which causes shutdown of said loom; means for activating one of said condition responsive devices responsive to a warp yarn breaking; means for activating another of said condition responsive devices responsive to a filling yarn breaking; means coupled to said condition responsive devices for generating a plurality of distinguishable signals of identifying character for indicating the cause of shutdown of the loom; means coupled to said last mentioned means for momentarily interrupting said distinguishable signals responsive to an operator actuating such when attending the loom for causing the continuity of the signal to be interrupted while maintaining the character thereof; and a data gathering device coupled to the output of said signal generating means for monitoring the operation of said loom, whereby the portion of the signal preceding the interruption of the signal indicates the unattended down-time of the loom and the portion of the signal succeeding the interruption indicates the attended time during shutdown and the character of said signal identifies the cause of shutdown of the loom.

12. In a textile strand manipulating machine a signal generating means for generating a signal identifying the cause of shutdown of the machine as well as identifying the unattended and attended time during the duration of such shutdown comprising: a plurality of condition responsive devices each of which is activated responsive to a particular faulty operation which causes shutdown of said machine; means for activating one of said condition responsive devices responsive to a strand breaking thus causing the machine to be shut down; means for activating another of said condition responsive devices responsive to the strand manipulating machine being shut down for another cause; means coupled to said condition responsive devices for generating a plurality of distinguishable signals of identifying character for indicating the cause of shutdown of the machine; means coupled to said last mentioned means for momentarily interrupting said distinguishable signals responsive to an operator actuating such when attending the machine for causing the continuity of the signal to be interrupted while maintaining the character thereof; and a data gathering device coupled to the output of said signal generating means for monitoring the operation of said machine, whereby the portion of the signal preceding the interruption of the signal indicates the unattended down-time of the machine and the portion of the signal succeeding the interruption indicates the attended time during shutdown and the character of said signal identifies the cause of shutdown of the machine.

13. In a system for monitoring and recording the operation of a plurality of textile strand manipulating machines producing distinguishable characters identifying the cause of the shutdown of individual machines, said system having a multiple pen recorder having a plurality of pens, means for feeding paper along in contact with said pens, and individual electromagnetic means for operating each pen for causing such pen to change the position of the line it draws on the paper, the improvement including: a plurality of condition responsive devices carried by each machine being activated responsive to the occurrence of a shutdown caused by a particular operating condition; each of said condition responsive devices having a member movable responsive to a particular operating condition, and a fixed member; signal generating means coupled to each machine; means for connecting one of said members of one of said condition responsive devices to said signal generating means for causing said signal generating means to produce an output signal having a first frequency when said members of said one of said condition responsive devices make electrical connection actuated by a particular operating condition, such as breaking of a strand; means for connecting another of said condition responsive devices to said signal generating means for causing said signal generating means to produce an output signal having a second frequency when said another of said condition responsive devices is activated; and means for supplying the outputs of said signal generating means to a respective electromagnetic means, said electromagnetic means causing the pen associated therewith to change the position of the line being drawn on the paper responsive to the output signal being supplied thereto for producing distinguishable marks forming a character for identifying the cause of the particular operating condition of a machine, whereby when a machine is shutdown said system produces a character which identifies the cause of said shutdown.

14. The combination as set forth in claim 13, wherein one of said condition responsive devices is a switch operated by a warp yarn stop motion device on a loom and wherein said another of said condition responsive devices is a switch operated by a filling yarn stop motion device on a loom.

15. A system for monitoring the operation of a plurality of machines which produces signals identifying the cause of shutdown of an individual machine as well as identifying the unattended and attended time during said shutdown period comprising: a plurality of condition responsive devices each of which is capable of being activated responsive to a particular operating condition; means for activating said condition responsive devices responsive to the occurrence of given operating conditions; means for generating signals responsive to the activating of said condition responsive devices; recorder means for receiving said signals responsive to the activating of said condition responsive devices; said recorder means including a plurality of recording pens and electromagnetic means for operating said pens to provide a distinguishable recording in response to said signals; manually operated switch means provided for interrupting the continuity of said signals responsive to being activated; said signals indicating the unattended down-time of a machine before actuating the manually operated switch, the attended time during shutdown being indicated by signals produced after actuating the manually operated switch, and said signals being of an identifiable character identifying the cause of the shutdown of the machine.

References Cited

UNITED STATES PATENTS

| | | | |
|---|---|---|---|
| 2,207,715 | 7/1940 | Bumstead | 346—33 X |
| 3,228,032 | 1/1966 | Zumkeller | 346—62 |
| 3,275,987 | 9/1966 | Mann | 340—147 |

RICHARD B. WILKINSON, *Primary Examiner.*

JOSEPH W. HARTARY, *Assistant Examiner.*